US010885157B2

(12) United States Patent
Hanusiak et al.

(10) Patent No.: US 10,885,157 B2
(45) Date of Patent: Jan. 5, 2021

(54) DETERMINING A DATABASE SIGNATURE

(71) Applicant: International Business Machines Corporation, Armonk, NY (US)

(72) Inventors: Tomasz Hanusiak, Czarny Dunajec (PL); Grzegorz Szczepanik, Cracow (PL); Jaroslaw Osinski, Mrozy (PL); Konrad Wojciech Komnata, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 165 days.

(21) Appl. No.: 15/477,796

(22) Filed: Apr. 3, 2017

(65) Prior Publication Data

US 2018/0285536 A1    Oct. 4, 2018

(51) Int. Cl.
*G06F 21/12* (2013.01)
*G06F 16/00* (2019.01)

(52) U.S. Cl.
CPC ............ *G06F 21/121* (2013.01); *G06F 16/00* (2019.01)

(58) Field of Classification Search
CPC ....... G06F 21/121; G06F 17/30; G11B 27/28; G11B 2220/65; H04L 29/06
USPC .......................................................... 726/30
See application file for complete search history.

(56) References Cited

U.S. PATENT DOCUMENTS

| | | | |
|---|---|---|---|
| 6,341,289 B1 | 1/2002 | Burroughs et al. | |
| 6,360,334 B1 | 3/2002 | Kavanagh et al. | |
| 7,251,599 B2 | 7/2007 | Maison et al. | |
| 7,970,745 B2 | 6/2011 | Morcott | |
| 8,335,786 B2 * | 12/2012 | Pereira | G06F 17/30784 707/728 |
| 8,499,281 B2 | 7/2013 | Ahadian et al. | |
| 8,966,451 B2 | 2/2015 | Pastorelli | |
| 8,978,006 B2 | 3/2015 | Hirsch et al. | |
| 9,189,516 B2 * | 11/2015 | Wilson | H04L 51/12 |
| 9,396,285 B1 | 7/2016 | Fitterer et al. | |
| 9,646,157 B1 | 5/2017 | Hou et al. | |
| 2003/0023599 A1 * | 1/2003 | Garcia | G06F 9/465 |
| 2003/0084123 A1 | 5/2003 | Kamel | |
| 2004/0177075 A1 | 9/2004 | Rangadass | |

(Continued)

FOREIGN PATENT DOCUMENTS

| | | |
|---|---|---|
| WO | 9503586 A1 | 2/1995 |
| WO | 9917232 A1 | 4/1999 |

OTHER PUBLICATIONS

Unknown, "Database Schema Comparison Tool," Altova product: DatabaseSpy, printed Mar. 1, 2016, 1 page. http://www.altova.com/databasespy/database-structure-compare-tool.html.

(Continued)

*Primary Examiner* — Alexander Lagor
*Assistant Examiner* — Moeen Khan
(74) *Attorney, Agent, or Firm* — Peter Edwards (57) ABSTRACT

A method, a computer program product, and a data processing system for determining a database signature of a database includes determining a set of characteristics of the database; identifying at least one unique characteristic of the database that is unique among characteristics of other databases, which characteristics of other databases are stored in a signature data store; generating the database signature from the at least one unique characteristic; and storing the database signature and the unique characteristic in the signature data store.

15 Claims, 6 Drawing Sheets

(56) References Cited

U.S. PATENT DOCUMENTS

| | | |
|---|---|---|
| 2007/0016695 A1 | 1/2007 | Rabbers et al. |
| 2007/0088707 A1 | 4/2007 | Durgin et al. |
| 2007/0266139 A1 | 11/2007 | Guan et al. |
| 2007/0289016 A1* | 12/2007 | Pradhan ................ G06F 21/564 726/23 |
| 2008/0065893 A1 | 3/2008 | Dutta et al. |
| 2008/0168088 A1 | 7/2008 | Ahmad |
| 2009/0132345 A1* | 5/2009 | Meyssami .............. G06Q 10/10 705/7.33 |
| 2011/0093701 A1 | 4/2011 | Etchegoyen |
| 2011/0219235 A1* | 9/2011 | Takahashi ............... G06F 17/30 713/176 |
| 2012/0310996 A1* | 12/2012 | Kulack ............. G06F 17/30404 707/810 |
| 2013/0086114 A1 | 4/2013 | Wilson et al. |
| 2013/0339284 A1 | 12/2013 | Rowles et al. |
| 2014/0006796 A1 | 1/2014 | Smith et al. |
| 2014/0067868 A1 | 3/2014 | Kemmler et al. |
| 2014/0101635 A1 | 4/2014 | Hoffmann |
| 2014/0230068 A1 | 8/2014 | Kundapur et al. |
| 2014/0297713 A1 | 10/2014 | Meigen et al. |
| 2014/0298315 A1 | 10/2014 | Boudreau et al. |
| 2015/0095343 A1* | 4/2015 | Divilly .................... H04L 67/28 707/741 |
| 2015/0356094 A1* | 12/2015 | Gorelik ............. G06F 17/30076 707/748 |
| 2016/0224794 A1 | 8/2016 | Roberts et al. |
| 2016/0254911 A1 | 9/2016 | Manchepalli et al. |
| 2016/0291968 A1 | 10/2016 | Chen et al. |
| 2017/0070492 A1* | 3/2017 | Rubin ............... G06F 17/30312 |
| 2017/0103226 A1 | 4/2017 | Eberlein et al. |
| 2017/0124121 A1 | 5/2017 | Fitterer et al. |
| 2017/0161511 A1 | 6/2017 | Eberlein et al. |
| 2017/0249319 A1 | 8/2017 | Savarkar et al. |
| 2018/0018365 A1 | 1/2018 | Hanusiak et al. |

OTHER PUBLICATIONS

Unknown, "About the Express Software Identification Database (ESID)®," Express Metrix, 2011, pp. 1-5. http://www.expressmetrix.com/pdf/About_the_Express_Software_Identification_Database.pdf.

Unknown, "JD Edwards EnterpriseOne Tools Configurable Network Computing Implementation Guide," E14695-03, Release 8.98, Update 4, Oct. 2013, 212 pages, Oracle Help Center. https://docs.oracle.com/cd/E17984_01/doc.898/e14695/undrstnd_datasources.htm.

Hanusiak et al., "Mapping Database Structure to Software," U.S. Appl. No. 15/212,772, filed Jul. 18, 2016.

List of IBM Patents or Patent Applications Treated as Related, Signed Apr. 3, 2017, 2 pages.

Unknown, "How to Create a Custom Software Signature," CA Client Automation, 12.9, Ca Technologies Documentation, Last Updated Dec. 11, 2015, Printed May 12, 2018, 11 pages.

\* cited by examiner

DETERMINING A DATABASE SIGNATURE

The present invention relates in general to database management systems, and in particular, to a method, as well as a computer program product and a data processing system for determining a database signature of a database.

BACKGROUND

Today many software products include a database component. For example, when installing a particular banking application, a particular database (e.g., a customized DB2 database) may also have to be installed so that a user has access to a particular record associated with the user's bank account. The structure of a database may be tailored or customized based on the particular software product that is being utilized. For example, the banking application described above may correspond to Bank X and may include a database that has a very specific schema and table column identity layout (e.g., the first column/primary key is a "customer ID" field, the second column is a "Bank X customer name" field, etc.). Therefore database signatures may be used to identify particular databases for particular applications and software products.

SUMMARY

A method is proposed for determining a database signature of a database, the method comprising (i) determining a set of characteristics of the database; (ii) identifying at least one unique characteristic of the database that is unique among characteristics of other databases, which characteristics of other databases are stored in a signature data store; (iii) generating the database signature from the at least one unique characteristic; and (iv) storing the database signature and the unique characteristic in the signature data store.

Further, a computer program product is proposed for determining a database signature of a database, the computer program product comprising a computer readable storage medium having program instructions embodied therewith, the program instructions executable by the computer to cause the computer to perform a method comprising, (i) determining a set of characteristics of the database; (ii) identifying at least one unique characteristic of the database that is unique among characteristics of other databases, which characteristics of other databases are stored in a signature data store; (iii) generating the database signature from the at least one unique characteristic; and (iv) storing the database signature and the unique characteristic in the signature data store.

Further, a data processing system for execution of a data processing program is proposed, comprising computer readable program instructions for performing the method described above.

BRIEF DESCRIPTION OF THE DRAWINGS

The present invention together with the above-mentioned and other objects and advantages may best be understood from the following detailed description of the embodiments, but not restricted to the embodiments.

DETAILED DESCRIPTION

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

Generation of a database signature may require expert knowledge of the products and the internal database structure. Therefore a favorable embodiment is proposed for automatically generating such database signatures of databases.

The illustrative embodiments provide a system for determining a database signature of a database.

The illustrative embodiments are sometimes described herein using particular technologies only as an example for the clarity of the description. The illustrative embodiments may be used for (i) determining a set of characteristics of the database; (ii) identifying at least one unique characteristic of the database that is unique among characteristics of other databases, which characteristics of other databases are stored in a signature data store; and (iii) generating the database signature from the at least one unique characteristic; and (iv) storing the database signature and the unique characteristic in the signature data store.

Advantageously structural information of the databases (e.g., all schemas/tables/columns/indexes/keys/procedures, etc.) may be stored and then the structure of a newly added database is compared against all previous databases.

Figure 1:
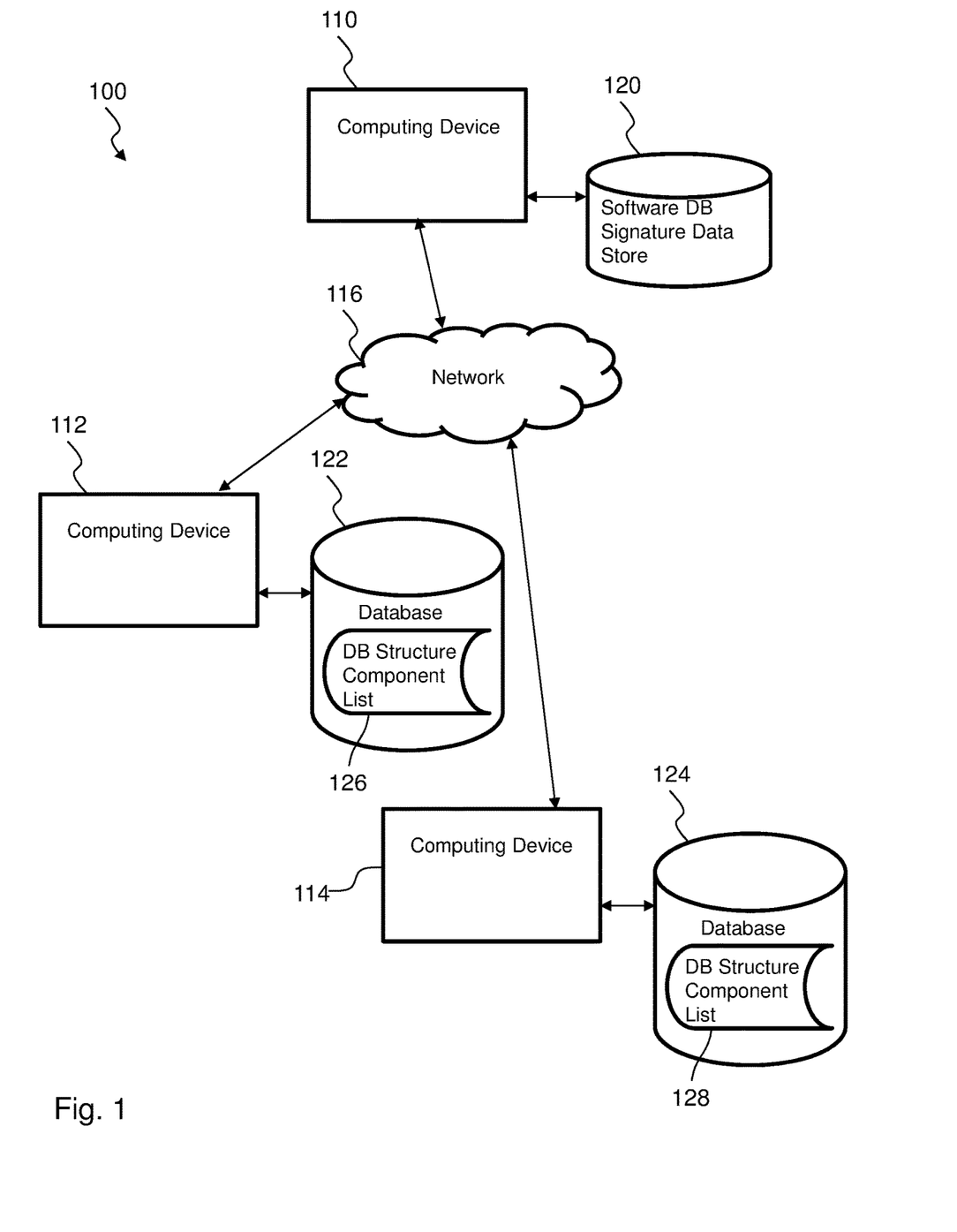
FIG. 1 depicts a block diagram of a computing environment of a database management system according to an embodiment of the invention for determining a database signature of a database.

FIG. 1 depicts a block diagram of a computing environment 100 of a database management system according to an embodiment of the invention for determining a database signature of a database 122. The computing environment 100 may include a computing device 110 (or set of computing devices) which is communicatively coupled (e.g., via the network 116) to the computing devices 112 and/or 114. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 116.

Due to embodiments, the signature data store 120 may be connected to the first computing device 110 and the database 122 may be connected to at least a second computing device 112, 114, wherein the first computing device 110 and the second computing device 112, 114 are connected via the network 116.

In some embodiments, the computing environment 100 may represent a database cluster environment. The term "database cluster" may refer to two or more compute nodes (e.g., server computing devices). Each compute node (e.g., computing device 112 and 114) includes or is directly associated with a storage device (or devices) that stores a database. The databases associated with the respective compute nodes may be identical, i.e., a single database is replicated on the storage device associated with each compute node. Alternatively, a single database may be partitioned and the databases associated with the respective compute nodes may each contain one of the partitions of the single database. Database clustering may be useful for providing continuous availability of data in case one or more compute nodes or associated databases fail (e.g., because of a failed processor, failed connection path, failed storage device, etc.). When a database fails, a failover operation may be executed such that any database operation that was undertaken but not completed by the failed database is assumed by a different database within another compute node.

Figure 6:
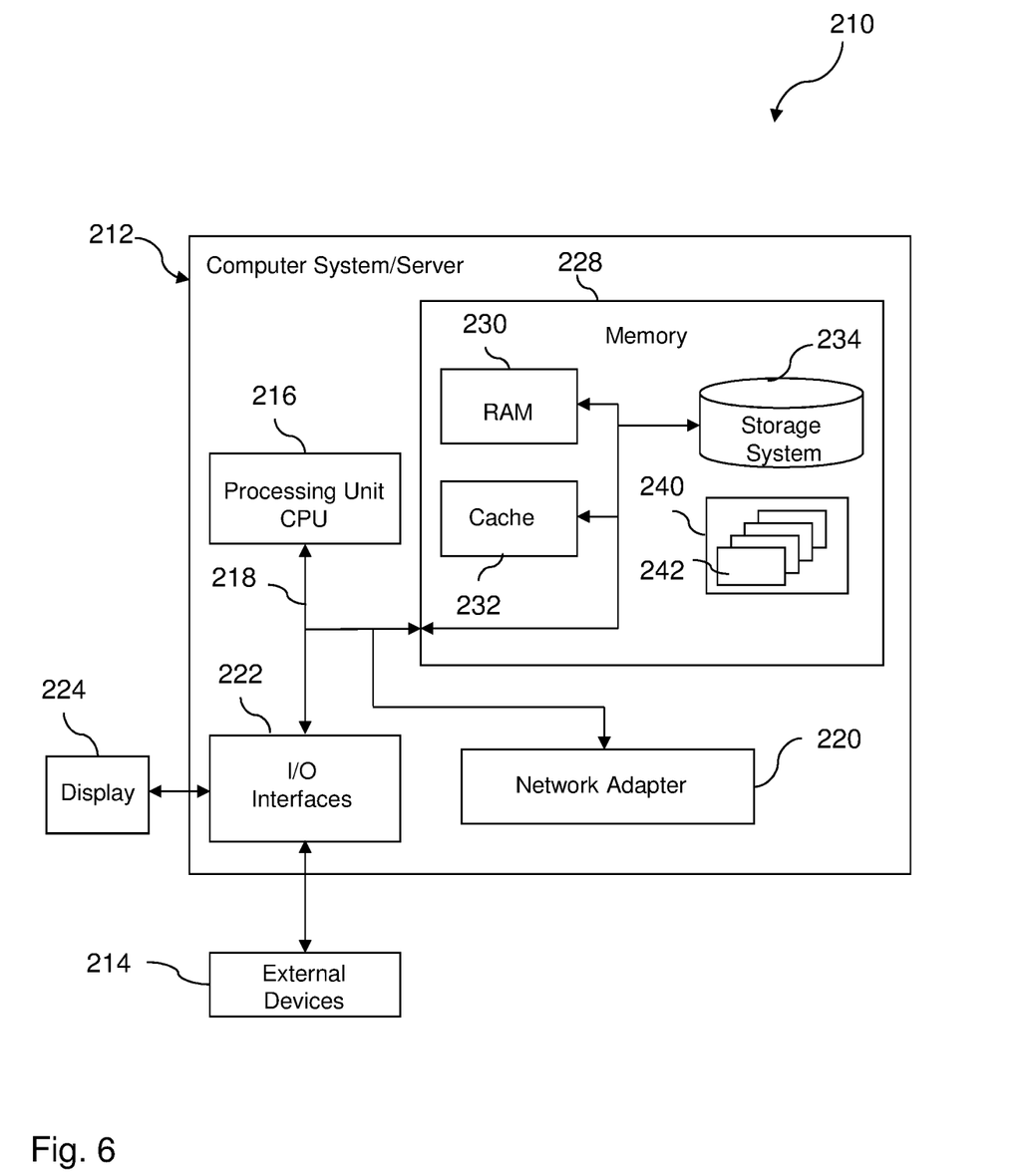
FIG. 6 depicts an example embodiment of a data processing system for executing a method according to the invention.

Consistent with some embodiments, the computing devices 110, 112 and/or 114 may be configured the same or analogous to the data processing system 210, as illustrated in FIG. 6. In some computing environments, more or fewer computing devices and/or databases may be present than illustrated in FIG. 1. In some embodiments, the computing device 110 may represent a client computing device and the computing devices 110 and/or 114 may represent separate server computing devices. Accordingly, the client computing device may request a service or resource from the server computing device(s), which executes or completes the client request. In some embodiments, some or each of the components (e.g., the computing device 114 and the computing device 112) of the computing environment 100 represent single compute instances of a single computing device (e.g., computing components within a chassis, a blade server within a blade enclosure, an I/O drawer, a processor chip, etc.), as opposed to separate computing devices.

As illustrated in FIG. 1, the computing device 110 in some embodiments may include program instructions and when coupled with a processor(s) may be configured to at least search for unique characteristic elements or set of characteristic elements, such as e.g. structural information of a database (e.g., the database (DB) structure component list 126 of database 122) in one or more already existing database signatures (e.g., within the software DB signature data store 120) in order to determine a database signature of a particular database, which may be newly connected to the computing environment.

The term "structural information" or database "structure" as described herein may refer to particular physical/logical attributes that describe or represent a database and/or a database's physical/logical components, such as data object(s) within a database. For example, structural information may include information about data structures such as: a schema structure (e.g., a representation of how data is organized), table structure (e.g., the names and order of each table), column structure (e.g., the names and order of each column), and/or key information (e.g., the name of primary and/or foreign keys) of a particular database.

The term "database signature," as described herein may refer to some or each of the components or elements that makeup and/or are included in a database. In some embodiments, a database signature may effectively be a "fingerprint" or "token" of a database. A "fingerprint" may utilize an algorithm that maps a relatively large data item into a much shorter bit string (e.g., the fingerprint), which uniquely identifies the database. The shorter bit string may represent one or more units of information that makeup the database (e.g., structural information about a database). In some embodiments, the database signature(s) include a database identity (e.g., name of the database) that may be mapped to one or more database structure identities included within a database, which is described in more detail below.

In some embodiments, the software DB signature data store 120, the database 122, and/or the database 124 may represent individual servers (e.g., database servers) or a database management system utilized to process and access the actual data within a storage device (e.g., disk or Random Access Memory (RAM)) of the respective computing devices. The software DB signature data store 120 may be a data store that includes each database signature. The database 122 may be a particular database (e.g., a Structured Query Language (SQL) database) that is coupled to the computing device 112 (e.g., via shared memory). The DB structure component list 126 may include the structural information of the database 122.

The database 124 may also be a particular database that is coupled to the computing device 114. The DB structure component list 128 may also include the structural information of the database 114. In some embodiments, the DB structure component list 126 and/or 128 may be fingerprints or signatures for their respective databases 122, 124 such that when trying to determine database structures of a database, it may easily be identifiable via the fingerprint (e.g., a database manager does not have to scan an entire database to obtain structure components). In alternative embodiments, the DB structure component list 126 and/or 128 may represent a consolidated list of structural information after each database manager of a database (e.g., database 122) has scanned the database to retrieve the structural information in response to a particular request.

The computing devices 110, 112 and/or 114 may communicate with another via any suitable network 116. For example, the network 116 may represent a local area network (LAN), a general wide area network (WAN), a cellular network, and/or a public network (e.g., the Internet).

In some embodiments, the databases 122 and/or 124 may be queried in order to determine the database signatures using the DB structure component list 126 and/or 128, which is described in more detail below. In other embodiments, automated functions may be performed as a background task (e.g., without a user requesting information), such that upon detection of an event, one or more operations may be performed, as described in more detail below.

Figure 2:
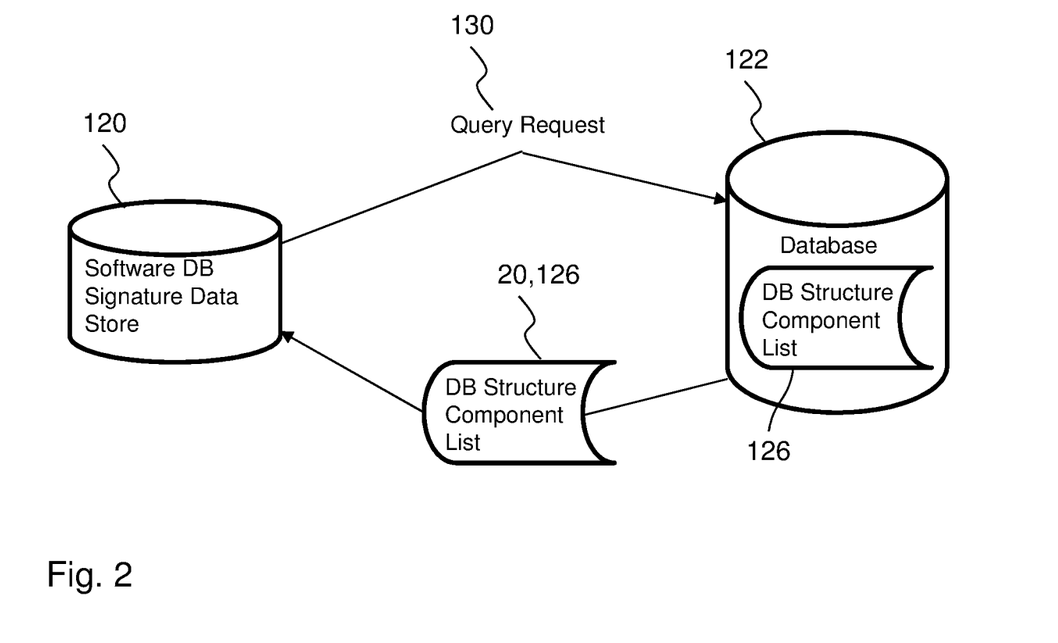
FIG. 2 depicts a diagram illustrating how structural information of a database may be obtained according to an embodiment of the invention.

FIG. 2 depicts a diagram illustrating how structural information 20 of a database 122 may be obtained according to an embodiment of the invention. In some embodiments, as illustrated in FIG. 2, a query request 130 may be sent to the database 122 to obtain the structural information 20 of the database 122. The query request 130 may be sent automatically, if a new database is connected to the computing environment 100. For example, after establishing a wireless connection with the computing device 112, a query statement 130 (e.g., SELECT attribute list FROM table list WHERE condition) may be automatically issued on the computing device 110 to request one or more database structure information 20 of database 122. The database manager of the database 122 may then scan the database 122 in order to provide the DB structure component list 126 according to the query request 130. Alternatively, the DB structure component list 126 may be a pre-formed list or fingerprint such that the database manager does not have to scan the database 122 to obtain structural information 20, but may identify and select the DB structure component list 126.

The query language may be any suitable language, such as structured query language (SQL) for relational databases, multidimensional expression (MDX) for multidimensional databases or online analytical procession (OLAP) databases, online transactional processing databases (OLTP), or any other language for any other database.

The computing device 112 of the database 122 may then transmit the DB structure component list 126 to the computing device 110 such that the DB structure component list 126 can then be searched (e.g., via the match estimate module 104) for characteristics of other database signatures within the software DB signature data store 120 in order to infer that the characteristics may be unique to the database 122, which is described in more detail below.

Although FIG. 2 illustrates how structural information 20 may be obtained from the database 122, it is to be understood that the same or analogous procedures can also occur to obtain structural information 20 from the database 124 of FIG. 1.

Figure 3:
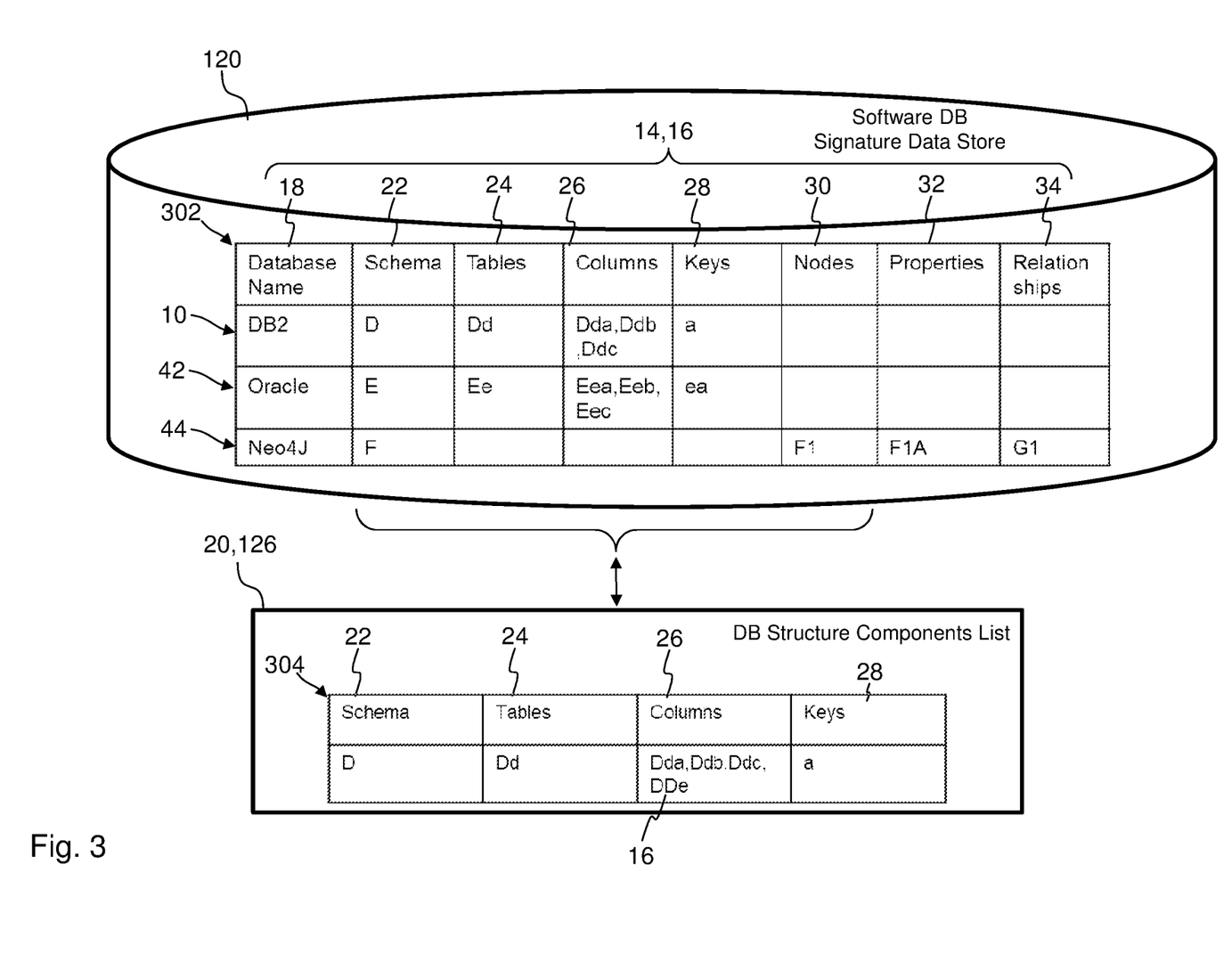
FIG. 3 depicts a diagram illustrating the information, particularly the structural information, stored in the software database signature data store according to an embodiment of the invention.

FIG. 3 depicts a diagram illustrating the information, particularly the structural information 20, stored in the software database (DB) signature data store 120 according to an embodiment of the invention. The software DB signature data store 120 includes the table 302. FIG. 3 further includes the DB structure component list 126, which includes the table 304. Although FIG. 3 illustrates that only a particular data store (software DB signature data store 120) and list (DB structure component list 126) include the tables 302 and 304, it is recognized that more data stores and lists may include identical or analogous tables to the tables 302 and 304. For example, database 124 of FIG. 1 may include within its DB structure component list 128, a table identical or analogous to the table 304.

In embodiments, the table 302 represents a database table object with multiple columns (also known as fields or attributes) and records. In some embodiments, each record represents a database signature 10, 42, 44 such that a particular database identity (e.g., a name of a database product) is mapped to one or more associated database structure identities. For example, the first record includes database name "DB2" that is mapped to various other features via the other columns that are part of the first record (e.g., database DB2 is mapped to schema D that includes tables Dd). Therefore, mapping may include that relationship between various columns within a single record (or series of records).

According to favorable embodiments the database signatures 10, 42, 44 may comprise one or more units of data selected from a group comprising at least a name 18 of the database 122, a schema structure 22 of the database 122, a table structure 24 of the database 122, a column structure 26 of the database 122, and a key structure 28 of the database 122.

As illustrated in the table 302, the database signatures 10, 42, 44 include various columns of data, such as "Database Name" 18, "Schema" 22, "Tables" 24, "Columns" 26, "Keys" 28, "Nodes" 30, "Properties" 32 and "Relationships" 34. The columns of the table 302 may include various database structural information 20 concerning the database specified under the "Database Name" column 18. Structural information 20 of the database 122 may comprise one or more units of data from a group comprising at least a schema structure 22 of the database 122, a table structure 24 of the database 122, a column structure 26 of the database 122, a key structure 28 of the database 122.

The "Schema" column 22, for example, may describe how the data is organized within the particular database specified under the database name column. A database "Schema" 22 may specifically be a set of integrity constraints that are imposed on a database. In some embodiments, the "Schema" column 22 or schema information may depict a graphical or logical representation of a database structure, the structure of which includes information concerning how each database object is related. For example, in a relational database, the schema may define or depict each table, field, relationship, view, index, package, procedure, function, queue, trigger, type, sequence, synonym, database link, and/or directory that is included in a particular database. In some embodiments, instead or in addition to graphically representing the schema, the "schema" column 22 or schema information may include database language textual information in a data dictionary that describes database objects and/or relationships. Schema information may include information such as the number of tables, object, nodes, records, etc. in the database and the relationships between them. In an example illustration, the "schema column" 22 may indicate that a first schema represents a "star" schema and that a second schema represents a "snowflake" schema.

The "Table" column 24 includes information about one or more tables of a database specified in the "Database Name" column 18. This information may include table structure information associated with a particular database table. For example, table structure information may include: the name or other identifier of a table, the number of columns that are within the table, etc. The "Column" column 26 specifies column structure information about one or more columns within the table specified under the "Table" column 24. For example, column structure information may include a name or other identifier of one or more columns, the size constraints of one or more columns (e.g., column string width/length and/or number of bytes of data to be placed in in one or more columns). For example, column size may define fixed string length (e.g., number of characters) allowed for data entry into each column.

The "Keys" column 28 or other database structure information may specify structure information about keys (e.g., primary and/or foreign keys) for a particular column. A "primary" key may be a column that uniquely identifies each record and only one may exist per table. The structural information may include the name or identifier of the primary key attribute (e.g., "social security number"), the size of the key column, etc. A "foreign" key may be one or more columns in a first table that provides a link between data of a second table. For example, in a relational database, a foreign key from a first table may point to or refer to a primary key in a second table. The key column 28 or database structural information 20 may specifically include a name or identifier of the foreign key (column) for a particular table.

It is recognized that the table 302 may include structure information associated with various database types (e.g., relational databases, graph or other object oriented databases, hierarchical databases, network databases, online transaction processing (OLTP) databases, online analytical processing (OLAP) databases, etc.). For example, as illustrated in in the table 302, there may the columns of "Nodes"

30, "Relationships" 34, and "Properties" 32, which may correspond to graph databases. An object-oriented database utilizes object-oriented programming languages and may include data (e.g., sound/video data and methods describing what to do with data) that is stored as objects, as opposed to storing strings or integers in two-dimensional arrays in tables that include rows and columns like in a relational database. Each one of these objects may belong to an object class. An object class may share one or more objects a common structure and/or behavior.

The "Node" column 30 may represent each name, identifier, or label (e.g., object) of each node, the size of the node, how many nodes exist, etc. For example, the label of a first node may be "person." The "Properties" column 32 may represent attributes or metadata associated with particular nodes, such as keys or key pairs. For example, using the illustration above, the first node labeled "person" may include "name: John," and "id: 1". The "Relationships" column 34 may specify how two particular nodes (e.g., a "start" node and "end" node) are related, which may be analogous to relational databases that utilize keys to demonstrate how two tables are related. The structural information that may be obtained is the name or identifier of the relationship, the direction of the relationship, etc. The name or identifier of the relationship may indicate a verb action associated with two nodes. For example, using the illustration above, the first node of "person," and key "John" may include a relationship named "works at," and that points or refers to a second node named "business," with a key named "supermarket A." Accordingly, these two nodes along with the relationship indicates that "John" "works at" "supermarket A."

In various embodiments, the table 302 (or table 304) includes more columns than illustrated in FIG. 3. For example, there may be more columns that correspond with more database types (e.g., hierarchical databases, network databases, online transaction processing (OLTP) databases, online analytical processing (OLAP) databases, etc.) depending on the software utilized. For example, the table 302 and/or 304 may include database structure information about a record (e.g., name) of a parent or child data object and/or a link in a hierarchical or network database. In some embodiments, there may be more columns in table 302 and/or 304 that include various other database structure type of information. For example, there may be structure information that includes information about indexes (e.g., name of index, type of index, organization or graphical layout of the index, record boundaries of the index, etc.), views, statistical information for query optimization (e.g., histogram specifications, bucket specifications), etc.

FIG. 3 also includes the DB structure component list 126, which includes the structural information about database 122. The structural information is represented by the table 304. The table 304 includes column data about: "Schema" 22, "Tables" 24, "Columns" 26, and "Keys" 28. In embodiments, this header information (i.e., schema, tables, columns, keys) in table 304 may include the same or analogous types of information as discussed above for the table 302 for the software signatures (e.g., schema, tables, column, keys, etc.). For example, the "Columns" column 26 in table 304 may include a name or other identifier of one or more columns, the size constraints of one or more columns (e.g., column(s) string width/length and/or number of bytes of data to be placed in one or more columns) for the database 122, which may be the same type of information that the "columns" column 26 in the table 302 includes as discussed above.

In some embodiments, the structural information 20 in table 304 is compared to the database signatures in table 302 in order to determine what database 122 is associated with the DB structure component list 126. For example, in some embodiments, each column of the table 304 may be compared to each record (database signature) of a corresponding database structure column within the table 302 (i.e., schema, tables, columns, keys, nodes, relationships, properties), and a first match estimate may be calculated for that record in a particular column (e.g., a percentage match). And then an inference may be made that the structure information in the table 304 is associated with a particular database.

In the following an example illustration is presented for searching for unique characteristics 16 or unique sets of characteristics 14 as structural information 20 of the database 122 stored in the signature data store 120. For example, table 304 may indicate that the schema of database 122 is D. When compared with the "Schema" column 22 of table 302, there is a match of 100% with the first record (corresponding to database DB2) because the schema is also D. However, there is a 0% match for the second and third records within table 302 because the schema for databases Oracle and Neo4J is schema E and F schema respectively. Likewise, the table 304 indicates that the database 122 includes the table value of "Dd." When compared to the table values under the "Tables" column of table 302, there is once again a 100% match associated with the first record because database DB2 includes the table value of "Dd." And again, there is a 0% match for databases Oracle and Neo4J because these databases include tables Ee and no tables respectively. Table 304 also indicates that the database includes the columns of "Dda," "Ddb" "Ddc" and "Dde". However, when comparing this to the "Columns" column of table 302, there may not be a 100% match with any record. This may be because customized columns may be generated outside of a default databases setting. Accordingly, for the first record there may be a 75% match instead of a 100% match because the column of "Dde" of table 304 may have been added or customized. There may also be a 0% match between the columns of table 304 and the second and third records (databases Oracle and Neo4J) of table 302. The "Keys" column 28 of table 304 may indicate that the database includes key "a" and when compared with the "Keys" column 28 of table 302 there may be a 100% match with database DB2 (because of the "a" value), and a 0% percent match when compared with the second and third records. The table 304 illustrates that there is no structural components of the database 122 that are associated with nodes, relationships, or properties (i.e., graph databases). Accordingly, there may be a 0% match between the DB structure component list 126 and any record under the columns of "Nodes" 30, "Relationships" 34 and "Properties" 32, which indicates that the database 122 is not a graph database.

Following this example illustration, the content of the table 304 is mainly congruent with the database signature 10 stored in the signature data store 120, but differing in the "Columns" column 26 with one unique characteristic 16 "Dde", which may thus be used for generating a new database signature.

In some embodiments, the table 302 in the software DB signature data store 120 represents a self-referential logical database model where every single entity is stored in a single table (table 302), as opposed to multiple tables or other structures. In other embodiments however, the table 302 may be illustrative only for visualization purposes and may correspond to other database types. For example, the "Schema" 22, "Tables" 24 and "Columns" columns 26 may be included in a first table within a relational database and the "Nodes" 30, "Relationships" 34 and "Properties" 32 may correspond to a second table within the same relational database. In other embodiments, the table 302 may represent information as found in any other type of database such as a network database, a hierarchical database, object-oriented database, etc.

According to favorable embodiments the inventive method for determining a database signature 10 of a database 122 comprises determining a set of characteristics 14 of the database 122; identifying at least one unique characteristic 16 of the database 122 that is unique among characteristics 14 of other databases 124. The characteristics 14 of other databases 124 may be stored in a signature data store 120. Further the method comprises generating the database signature 10 from the at least one unique characteristic 16 and storing the database signature 10 and the unique characteristic 16 in the signature data store 120. Characteristics 14 of the database 122 may be structural information 20 as illustrated in the tables 302, 304 in FIG. 3.

Due to embodiments identifying the at least one unique characteristic 16 comprises searching in the signature data store 120 for the same characteristic 16 related to other databases 124. The set of characteristics 14 thus may be identified from structural information 20 of the database 122. The at least one unique characteristic 16 may favorably comprise the structural information 20 of the database 122.

According to favorable embodiments the set of characteristics 14 may comprise the name 18 of the database 122 and identifying the unique characteristic 16 may thus comprise searching in the signature data store 120 for characteristics 14 related to other databases 124 having the same name 18.

If more than one unique characteristic 16 is identified, the smallest remaining set of characteristics 14 of other databases 124 may be identified and thus the database signature 10 may be generated based on this smallest remaining set of characteristics 14. The identified sets of characteristics 14 may be ordered according to the number of characteristics 14 of other databases 124.

Figure 4:
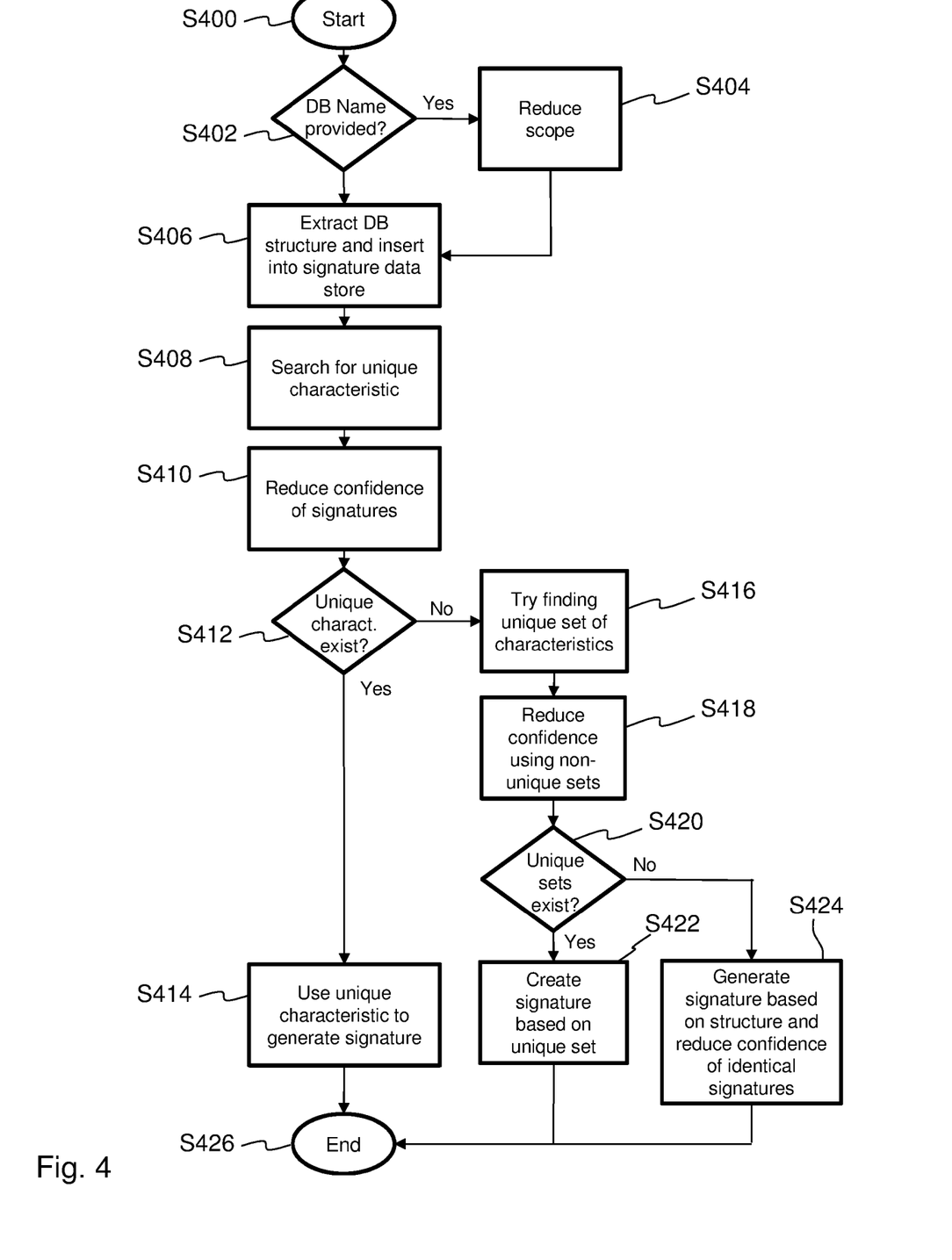
FIG. 4 depicts a flowchart of an example process for determining a database signature of a database according to an embodiment of the invention.

FIG. 4 depicts a flowchart of an example process for determining a database signature 10 of a database 122 according to an embodiment of the invention. Start of the process in step S400 may occur as an automated or background task (e.g. without a user request). Step S400 may be triggered, e.g., when a new product is added to the software DB signature data store 120 of the computing device 110 in FIG. 1. According to the inventive method first in step S402 it is checked if a database name 18, as indicated in FIG. 3, is provided. If this is the case, according to step S404, the scope of the search for unique characteristics 16 is reduced for products using the identical database name 18. If this is not the case, according to step S406, structural information 20 of the database is extracted, by a query request 130, as indicated in FIG. 2, e.g., and the structural information 20 is inserted into the signature data store 120.

Then, according to step S408, search for unique characteristics 16 is continued, searching for structural information 20 like unique schemas, tables, views, etc. which are not present in the signature data store 120. Alternatively, a computing device 112, associated with the database 122 may include a counter that is set to transmit structural information 20 concerning the database 122 every X period of time. Or the computing device 112, associated with the database 122, may transmit the structural information 20 based on a particular event, such as the structural components of the database 122 changing above a threshold.

Figure 5:
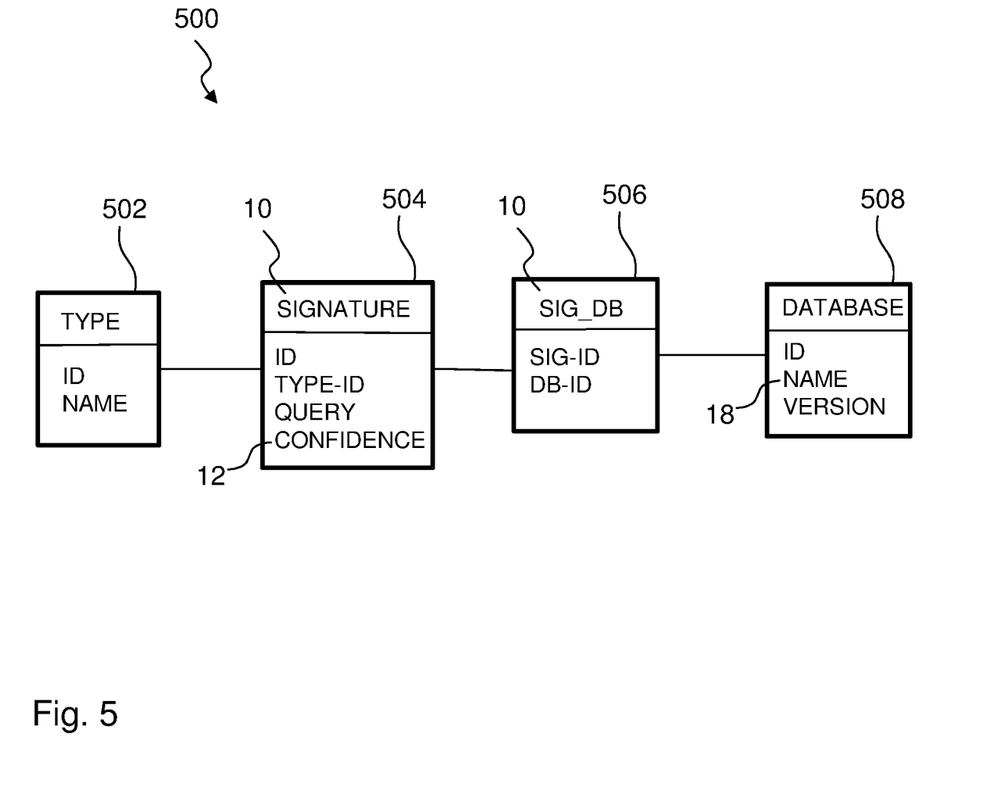
FIG. 5 depicts a diagram illustrating how a database signature may be represented according to an embodiment of the invention.

Next, according to step S410, a confidence value 12 of any database signatures 10, 42, 44 found, relying only on non-unique characteristics 14 is reduced, as described in more details with FIG. 5.

The search for a unique characteristic 16 is continued in step S412. If at least one unique characteristic exists, according to step S414, this unique characteristic 16 is used to generate a database signature 10, and the process comes to an end, step S426.

If there a unique characteristic does not exist, it is tried in step S416 to find the smallest unique set of characteristics 14, e.g., a set of all schemas 22, a set of all tables 24, a set of all views, a set of all schemas and all tables 24, a set of all schemas 22, all tables 24 and all views, a set of all indexes, a set of all schemas, all tables and all indexes, or the like. The order, in which the sets are used, may be determined on the size or the length of the individual sets.

Then, according to step S418, the confidence values 12 of the signatures 10, 42, 44, relying on non-unique sets of characteristics 14, is reduced.

If a unique set of characteristics 14 is found in step S420, this set of characteristics 14 is used to generate a database signature 10 in step S422, ending the process in step S426.

If a unique set of characteristics 14 is not found a database signature 10 is generated based on the whole structural information 20 of the database 122, according to step S424, and the confidence values 12 of all database signatures 42, 44, relying on the identical structural information 20 is reduced, ending the process in step S426.

FIG. 5 depicts a diagram illustrating how a database signature 10 may be represented according to an embodiment of the invention. In some embodiments, instead of or in addition to the table 302 as described in FIG. 3, database signatures 10 may be represented by the schema 500 as illustrated in FIG. 5. For example, the schema 500 may represent a relational database that includes various tables (relations) of data 502, 504, 506, 508. The schema 500 also illustrates how each table is related (e.g., via the lines that link a primary key in one table to a foreign key in another table).

The "TYPE" Table 502 represents a database language type for different databases that may be present on a source database (e.g., a database an administrator is working with). For example, the database language type may be Structured Query Language (SQL) (associated with relational databases), a Non-SQL (NoSQL) (associated with non-relational databases, such as graph databases), etc. The primary key of table 502 may be the "ID". The "NAME" data may specify the name of the database (e.g., SQL).

The "SIGNATURE" table 504 represents a database signature 10, which includes some or all of the data from each of the other tables table 502, 506 and/or 508. For example, the table 504 may include the "TYPE_ID" foreign key, which may be the primary key of the "TYPE" table 502. The table 504 may also include "QUERY" and "CONFIDENCE" data 12 that includes information about the signature query and confidence of the signature query.

According to favourable embodiments assigning a confidence value 12 to the database signature 10 may be based on the search of unique characteristics 16 of the database 122 and of the other databases 124, wherein the confidence value 12 is determined by the number of occurrences of the unique characteristic 16 in other databases 124. The confidence value 12 of the database signatures 10 may be reduced, if the same characteristic 16 is found for at least one other database 124. Due to embodiments the confidence value 12 of the database signatures 10 may be reduced by a factor corresponding to the number of other databases 124 for which the same unique characteristic 16 is found (the number) increased by at least one and, particularly, the confidence value 12 of the database signatures 10 of the databases 122, 124 may be reduced by a factor corresponding to the number of other databases 124 for which the same structural information 20 is found increased by one.

The "SIG_DB" (signature database) table 506 illustrates a signature (e.g., an ID, hash, string, alphanumeric text) that represents a database type. The primary key may be "SIG_ID" (signature ID) and the foreign key may be "DB_ID" (database ID), which corresponds to the "DATABASE" table 508's primary key. The "DATABASE" table 508 may include information about a database type (e.g., DB2, Informix, etc.). In embodiments, the table 508 may correspond to the information an administrator may input about a particular database that he/she has access to. The primary key may be the "ID" and the table 508 may specifically include "NAME" field that specifies the name of a database for each record (e.g., DB2) and a "VERSION" field that specifies a version of the database name (e.g., DB2 version 5.0).

For determining a database signature 10 a query to the database may be input that specifies the name and version of a particular database and/or anything within the DB structure component list 126 of FIG. 3 (e.g., tables, columns, etc.). The database manager of that database may then responsively fetch one or more records within the table to execute the query.

This query from the administrator may then be matched to a particular database associated with the schema 500. The table 504 may include the "QUERY", which may correspond to one or more record values for a particular set of fields or columns that the administrator chose for the query. For example, a first record may include values associated with the query under a "Table" column (e.g., Dd) and under a "Column" column (e.g., Dda). The first record may also include or be associated with other values that correspond to the particular database (e.g., information derived from the table 508). A matching estimate or "CONFIDENCE" may be performed the same as or analogous to the matching of the DB structure component list 126 and table 304 of FIG. 3. In some embodiments, table 504 of FIG. 5 represents or includes the information in the table 302 of FIG. 3. In some embodiments, any process or operation performed as described in FIG. 3 can also be performed for FIG. 5.

Referring now to FIG. 6, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an Operating System, one or more application programs, other program modules, and program data. Each of the Operating System, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for determining a database signature of a database, the method comprising:
    determining a first set of characteristics of the database;
    identifying at least one unique characteristic of the first set of characteristics compared to a second set of characteristics of one or more other databases, wherein the second set of characteristics of the one or more other databases are stored in a signature data store, wherein the identifying the at least one unique characteristic includes:
        assigning a confidence value to a particular characteristic that matches a possible unique characteristic of the database;
        searching in the signature data store for the particular characteristic that matches the possible unique characteristic, and
        reducing the confidence value of the database signature when the particular characteristic is found for at least a second database;
    generating the database signature based on the at least one unique characteristic, wherein the at least one unique characteristic is unique among corresponding characteristics of the one or more other databases, the generating the database signature comprising:
        mapping a database identity of the database to associated structural information about the database, the associated structural information including the at least one unique characteristic; and
        storing the database signature and the at least one unique characteristic to the signature data store.

2. The method according to claim 1, wherein the confidence value is determined by a number of matching occurrences of the at least one unique characteristic in the one or more other databases.

3. The method according to claim 1, wherein the confidence value of the database signatures is reduced by a factor corresponding to a number of a second set of the one or more other databases for which a same unique characteristic that matches the at least one unique characteristic is found.

4. The method according to claim 1, wherein:
    the second set of characteristics comprises a first name of the database, and
    the identifying the at least one unique characteristic comprises searching in the signature data store for characteristics related to the one or more other databases having a second name that matches the first name.

5. The method according to claim 1, wherein the second set of characteristics are identified from structural information of the database, the structural information including a description of particular logical attributes of the database.

6. The method according to claim 1, further comprising: ordering a smallest remaining set of the second set of characteristics according to a number of the second set of characteristics of the one or more other databases.

7. The method according to claim 6, further comprising:
    determining that more than one unique characteristic is identified;
    identifying a smallest remaining set of the second set of characteristics of the one or more other databases; and
    generating the database signature based on the smallest remaining set of the second set of characteristics.

8. The method according to claim 5, wherein the at least one unique characteristic includes the structural information of the database.

9. The method according to claim 1, wherein the confidence value of the database signature is reduced by a factor, wherein the factor corresponds to adding one to a number of the one or more other databases for which the particular characteristic that matches the at least one unique characteristic is found.

10. The method according to claim 1, wherein the signature data store is connected to a first computing device and the database is connected to at least a second computing device, wherein the first computing device and the second computing device are connected via a network.

11. The method according to claim 10, further comprising: issuing a query request from the first computing device to the second computing device for obtaining structural information of the database.

12. The method according to claim 1, wherein the database signature includes one or more units of data selected from a group consisting of: a name of the database, a schema structure of the database, a table structure of the database, a column structure of the database, and a key structure of the database.

13. The method according to claim 5, wherein the structural information of the database includes one or more units of data from a group consisting of: a schema structure of the database, a table structure of the database, a column structure of the database, and a key structure of the database.

14. A computer program product for determining a database signature of a database, the computer program product comprising a computer readable storage medium having program instructions embodied therewith, the program instructions executable by a computer to cause the computer to perform a method, the method comprising:
    determining a first set of characteristics of the database;
    identifying at least one characteristic of the first set of characteristics that is unique compared to a second set of characteristics of one or more other databases, wherein the second set of characteristics of the one or more other databases are stored in a signature data store, wherein the identifying the at least one unique characteristic includes:
assigning a confidence value to a particular characteristic that matches a possible unique characteristic of the database,
searching in the signature data store for the particular characteristic that matches the possible unique characteristic, and
reducing the confidence value of the database signature when the particular characteristic is found for at least a second database;
generating the database signature from the at least one unique characteristic, wherein the at least one unique characteristic is unique among corresponding characteristics of the one or more other databases, the generating the database signature comprising:
mapping a database identity of the database to associated structural information about the database, the associated structural information including the at least one unique characteristic; and
storing the database signature and the at least one unique characteristic in the signature data store.

15. A data processing system for execution of a data processing program, the data processing system having one or more computer processors and a memory, the data processing system configured to:
determine a first set of characteristics of the database;
identify at least one characteristic of the first set of characteristics that is unique compared to a second set of characteristics of one or more other databases, wherein the second set of characteristics of the one or more other databases are stored in a signature data store, wherein the identifying the at least one unique characteristic includes:
assigning a confidence value to a particular characteristic that matches a possible unique characteristic of the database,
searching in the signature data store for the particular characteristic that matches the possible unique characteristic, and
reducing the confidence value of the database signature when the particular characteristic is found for at least a second database;
generate a database signature from the at least one unique characteristic, wherein the at least one unique characteristic is unique among corresponding characteristics of the one or more other databases, the generating the database signature comprising:
mapping a database identity of the database to associated structural information about the database, the associated structural information including the at least one unique characteristic; and
store the database signature and the at least one unique characteristic in the signature data store.

\* \* \* \* \*